United States Patent

Matsuda et al.

(10) Patent No.: US 10,510,471 B2
(45) Date of Patent: Dec. 17, 2019

(54) COMPOSITION FOR BONDED MAGNETS, BONDED MAGNET AND INTEGRALLY MOLDED COMPONENT

(71) Applicants: SUMITOMO METAL MINING CO., LTD., Tokyo (JP); MABUCHI MOTOR CO., LTD., Matsudo-shi (JP)

(72) Inventors: Hideki Matsuda, Ichikawa (JP); Kenji Muraoka, Ichikawa (JP); Toshiya Iwai, Ichikawa (JP); Junichi Ishii, Ichikawa (JP); Atsushi Kawamoto, Tokyo (JP); Naoki Kitahara, Iwanai-gun (JP); Isao Shibuya, Matsudo (JP); Yasuhiro Yamagata, Matsudo (JP)

(73) Assignees: SUMITOMO METAL MINING CO., LTD., Tokyo (JP); MABUCHI MOTOR CO., LTD., Matsudo-shi (JP)

( * ) Notice: Subject to any disclaimer, the term of this patent is extended or adjusted under 35 U.S.C. 154(b) by 264 days.

(21) Appl. No.: 15/327,104

(22) PCT Filed: Jul. 9, 2015

(86) PCT No.: PCT/JP2015/069733
§ 371 (c)(1),
(2) Date: Jan. 18, 2017

(87) PCT Pub. No.: WO2016/013404
PCT Pub. Date: Jan. 28, 2016

(65) Prior Publication Data
US 2017/0178774 A1    Jun. 22, 2017

(30) Foreign Application Priority Data
Jul. 24, 2014    (JP) .................. 2014-150784

(51) Int. Cl.
| B22F 1/00 | (2006.01) |
| B22F 3/00 | (2006.01) |
| C08K 3/10 | (2018.01) |
| C08K 5/10 | (2006.01) |
| C08K 7/06 | (2006.01) |
| C22C 38/00 | (2006.01) |
| C08L 77/00 | (2006.01) |
| H01F 1/032 | (2006.01) |
| H01F 1/08 | (2006.01) |

(52) U.S. Cl.
CPC ............... *H01F 1/083* (2013.01); *B22F 1/00* (2013.01); *B22F 3/00* (2013.01); *C08K 3/10* (2013.01); *C08K 5/10* (2013.01); *C08K 7/06* (2013.01); *C08L 77/00* (2013.01); *C22C 38/00* (2013.01); *H01F 1/032* (2013.01)

(58) Field of Classification Search
CPC ... C08K 3/10; H01F 1/083; B22F 1/00; B22F 3/00
See application file for complete search history.

(56) References Cited

U.S. PATENT DOCUMENTS

| 5,319,337 | A | * | 6/1994 | Matsunari | .......... G03G 15/0921 335/303 |
| 6,346,565 | B1 | * | 2/2002 | Daifuku | .................... C08K 3/08 524/436 |
| 7,041,734 | B2 | * | 5/2006 | Wang | ...................... C08L 53/00 525/69 |
| 2002/0084440 | A1 | * | 7/2002 | Ohmori | ..................... B22F 1/02 252/62.54 |
| 2007/0152657 | A1 | | 7/2007 | Yabe et al. | |
| 2009/0274889 | A1 | * | 11/2009 | Iwahashi | .......... B29C 45/14311 428/312.8 |
| 2011/0074531 | A1 | * | 3/2011 | Yamashita | ............ H01F 1/0578 335/302 |
| 2014/0302947 | A1 | * | 10/2014 | Sullivan | ............. A63B 37/0051 473/374 |

FOREIGN PATENT DOCUMENTS

| JP | 60-225403 A | 11/1985 |
| JP | 2001-123067 A | 5/2001 |
| JP | 2004-352792 A | 12/2004 |
| JP | 2005-039218 A | 2/2005 |
| JP | 2005-072240 A | 3/2005 |
| JP | 2005-072564 A | 3/2005 |
| JP | 2008-010460 A | 1/2008 |
| JP | 2008-199035 A | 8/2008 |
| JP | 2010-251545 A | 11/2010 |
| WO | 2008/123450 A1 | 10/2008 |

OTHER PUBLICATIONS

International Search Report dated Sep. 15, 2015, issued for PCT/JP2015/069733.
Extended European Search Report dated Mar. 29, 2018, issued to EP Patent Application No. 15824778.3.

* cited by examiner

*Primary Examiner* — Kevin E Yoon
*Assistant Examiner* — Catherine P Smith
(74) *Attorney, Agent, or Firm* — Locke Lord LLP; James E. Armstrong, IV; Nicholas J. DiCeglie, Jr.

(57) ABSTRACT

A composition for bonded magnets according to the present invention contains from 88% by mass to 91% by mass (inclusive) of a samarium-iron-nitrogen magnet powder having an average particle diameter of from 1.8 μm to 2.8 μm (inclusive), from 0.5% by mass to 2.5% by mass (inclusive) of a polyamide elastomer having a tensile elongation at break of 400% or more and a bending modulus of elasticity of 100 MPa or more, from 0.5% by mass to 2.0% by mass (inclusive) of carbon fibers having fiber diameters of from 10 μm to 12 μm (inclusive) and from 0.3% by mass to 1.0% by mass (inclusive) of a carboxylic acid ester, with the balance made up of a polyamide resin which is composed of a polyamide 12 having a weight average molecular weight (Mw) of from 4,500 to 7,500 (inclusive) as determined by molecular weight distribution measurement.

6 Claims, No Drawings

COMPOSITION FOR BONDED MAGNETS, BONDED MAGNET AND INTEGRALLY MOLDED COMPONENT

TECHNICAL FIELD

The present invention relates to a composition for bonded magnets, and more specifically relates to a composition for bonded magnets, which can address the problems of such a composition containing a magnetic powder and a thermoplastic resin binder concerning fluidity during molding, durability in terms of thermal shock test and bonding strength when an adhesive is used, a bonded magnet produced using the same, and an integrally molded component produced by bonding the bonded magnet and a metal component via an adhesive.

BACKGROUND ART

A bonded magnet is produced by kneading a composition containing a magnet powder, a binder component such as an organic resin, and an additive such as a strengthening agent, a plasticizer, or a lubricant in combination using an extruder or the like, processing the kneaded product into pellets or the like, followed by injection molding, compression molding, or extrusion. In particular, a magnet that is produced by injection molding with the use of a thermoplastic resin such as a polyamide resin or a polyphenylenesulfide resin as a binder has high dimensional accuracy and requires no post-processing, and thus is advantageous in that the cost required for producing magnet can be reduced.

A composition for bonded magnets containing 80 mass % or more of a magnet powder and a thermoplastic resin as a binder is processed by injection molding or extrusion into a bonded magnet.

A polyamide resin, a polyphenylenesulfide (PPS) resin or the like is used as a thermoplastic resin binder, but a polyamide resin is more preferred in terms of mechanical strength, weather resistance, and the like. A resin composition containing a polyamide resin and a polyamide elastomer used therein has been proposed (for example, see Patent documents 1 and 2).

Moreover, it has also been proposed to knead carbon fibers as a strengthening agent into a composition for bonded magnets produced by kneading a magnet powder and an organic resin in order to improve the mechanical strength of a bonded magnet (for example, see Patent documents 3 and 4).

As described above, a bonded magnet is produced by injection molding or extrusion, and is often used in combination with a metal component for bonding with an adhesive, insert molding, and the like. However, a metal component and a bonded magnet material have different linear expansion coefficients, so that when a thermal shock test is conducted, the bonded magnet is cracked in many cases.

Furthermore, regarding the composition for bonded magnets, the higher the blending ratio of a magnet powder, the higher the magnetic properties as an injection-molded magnet. Hence, the blending ratio of a magnetic powder is preferably increased. However, the higher the blending ratio of a magnet powder, the lower the fluidity of the composition, which makes processing by injection molding difficult and may cause poor appearance such as a weld upon injection molding. An additive is generally added in order to improve fluidity. The fluidity is improved by the addition of an additive, however, this often adversely affects the strength, such that the thus molded bonded magnet becomes easily cracked in a thermal shock test. Moreover, the production of an integrally molded component by combining with a metal component using an adhesive is problematic in that the additive lowers the bonding strength between the bonded magnet and the metal component, making the addition of a lubricant difficult.

Patent Document 1: Japanese Unexamined Patent Application, Publication No. 2004-352792
Patent Document 2: PCT International Publication No. WO2008/123450
Patent Document 3: Japanese Unexamined Patent Application, Publication No. 2005-072240
Patent Document 4: Japanese Unexamined Patent Application, Publication No. 2010-251545

DISCLOSURE OF THE INVENTION

Problems to be Solved by the Invention

The present invention has been proposed in view of such circumstances. An objective of the present invention is to provide a composition for bonded magnets, which is excellent in fluidity and moldability during molding, enables to obtain a bonded magnet obtained from the composition having durability in terms of thermal shock test, and is capable of imparting excellent bonding strength to a product produced by bonding the bonded magnet to a metal component, and the like via an adhesive.

Means for Solving the Problems

The present inventors have intensively studied to achieve the above objective. As a result, the present inventors have discovered that the use of a composition for bonded magnets containing a specific magnet powder, a thermoplastic resin binder, and another additive in predetermined contents results in enhanced fluidity during molding, a bonded magnet molded using the composition is not cracked in a thermal shock test, and the bonding strength is improved when a metal component is bonded thereto via an adhesive. Thus the present inventors have completed the present invention.

(1) The present invention is a composition for bonded magnets, comprising 88 mass % or more and 91 mass % or less of a samarium-iron-nitrogen magnet powder having an average particle diameter of 1.8 μm or more and 2.8 μm or less, 0.5 mass % or more and 2.5 mass % or less of a polyamide elastomer having a tensile elongation at break of 400% or more and a bending modulus of elasticity of 100 MPa or more, 0.5 mass % or more and 2.0 mass % or less of carbon fibers having a fiber diameter of 10 μm or more and 12 μm or less, and 0.3 mass % or more and 1.0 mass % or less of a carboxylic acid ester, wherein the remainder is a polyamide resin comprising polyamide 12 having a weight average molecular weight Mw of 4500 or more and 7500 or less as determined by molecular weight distribution measurement.

(2) Moreover, the present invention is a composition for bonded magnets, wherein in the invention of (1), the above samarium-iron-nitrogen magnet powder is composed of the composition of $Sm_2Fe_{17}N_3$.

(3) The present invention is a bonded magnet, which is produced by injection-molding using the composition for bonded magnets according to (1) or (2).

(4) The present invention is an integrally molded component produced by integrally bonding the bonded magnet according to (3) to a metal component via an adhesive.

Effects of the Invention

The composition for bonded magnets according to the present invention exhibits good fluidity during molding, can be easily processed by injection molding and the like, enables to obtain a bonded magnet from the composition having high durability in terms of thermal shock test and undergoing no cracking, and can impart excellent adhesiveness to a product produced by bonding the bonded magnet to a metal component and the like via an adhesive.

PREFERRED MODE FOR CARRYING OUT THE INVENTION

Hereafter, specific embodiments (hereafter, referred to as "the embodiment(s)" of the composition for bonded magnets according to the present invention are described in detail as follows. Note that the present invention is not limited to the following embodiments, various modifications can be made without departing from the scope and principles of the present invention.

<<1. Composition for Bonded Magnets>>

The composition for bonded magnets according to the embodiment is a composition for producing a bonded magnet, and contains a samarium-iron-nitrogen (Sm—Fe—N-based) magnet powder, a resin binder, and other additives.

Specifically, the composition for bonded magnets according to the embodiment contains 88 mass % or more and 91 mass % or less of a samarium-iron-nitrogen (Sm—Fe—N-based) magnet powder having an average particle diameter of 1.8 µm or more and 2.8 µm or less. The composition further contains a thermoplastic resin binder as a resin binder, and as its thermoplastic resin binder, 0.5 mass % or more and 2.5 mass % or less of a polyamide elastomer having a tensile elongation at break of 400% or more and a bending modulus of elasticity of 100 MPa or more. The composition further contains 0.5 mass % or more and 2 mass % or less of carbon fibers having a fiber diameter of 10 µm or more and 12 µm or less, and 0.3 mass % or more and 1.0 mass % or less of a carboxylic acid ester. The composition further contains as the remainder, a polyamide 12 resin; that is a thermoplastic resin binder, having a weight average molecular weight Mw of 4500 or more and 7500 or less as determined by molecular weight distribution measurement.

[1] Magnet Powder

The composition for bonded magnets according to the embodiment contains a samarium-iron-nitrogen magnet powder as a magnet powder. The samarium-iron-nitrogen magnet is known as a high-performance inexpensive magnet. The magnet composed of the composition of $Sm_2Fe_{17}N_3$ is used as the samarium-iron-nitrogen magnet powder, so that the magnet can exhibit the highest saturation magnetization, although the composition differs depending on the amount of nitrogen.

A samarium-iron-nitrogen magnet can be obtained by a melt method using Fe and Sm metal, which involves melting a raw-material powder at 1500° C. or higher in a high-frequency furnace, an arc furnace or the like, pulverizing, and performing heat treatment for homogenization of the composition, so as to prepare a samarium-iron alloy, or nitriding a mother alloy obtained by a reduction-diffusion method for preparing a samarium-iron alloy by mixing and heating Fe or $Fe_2O_3$, $Sm_2O_3$ and the like with Ca. The samarium-iron-nitrogen magnet in a powdered form obtained by these methods has a nucleation-type mechanism for generating magnetic coercive force, so that a magnetic fine powder can be obtained by pulverization. Moreover, a magnetic fine powder can also be obtained without pulverization of a mother alloy by decreasing the particle size of a powder to be used as a starting raw material.

Here, the melt method involves extremely complicated steps, and specifically involves a step of nitriding after wet treatment since impurities are generated by oxidation due to exposure to air between steps. At this time, the nitriding step becomes unable to proceed uniformly due to the oxidized surface upon wet treatment, and then saturation magnetization, magnetic coercive force, and squareness are lowered among magnetic properties, resulting in a decreased maximum energy product. Accordingly, a reduction-diffusion method for which an inexpensive rare-earth oxide powder can be used as a raw material is preferred as a method for producing a samarium-iron-nitrogen magnet.

Specifically, a reduction-diffusion method involves, firstly, obtaining a reduced product containing a samarium-iron alloy, and then performing wet treatment for the reduced product, so as to remove the oxide of a reducing agent generated in the reduced product. Subsequently, the thus obtained Sm—Fe alloy is subjected to nitriding in a mixed air current containing ammonia and hydrogen, pulverizing, and then drying the resultant, thereby producing a desired samarium-iron-nitrogen magnet powder. Note that in the case of a $Sm_2Fe_{17}N_3$-based alloy, a magnet alloy coarse powder having an average particle diameter of higher than 20 µm has magnetic properties, so that the powder should be pulverized in an organic solvent, for example.

In the composition for bonded magnets according to the embodiment, a samarium-iron-nitrogen magnet powder having an average particle diameter of 1.8 µm or more to 2.8 µm is used. As described above, the samarium-iron-nitrogen magnet is of a nucleation type. Hence, the use of the magnet pulverized to have an average particle diameter of 1.8 µm or more results in better fluidity upon molding of a bonded magnet using the composition, which facilitates processing by injection molding or the like, and also results in no risk of heat generation due to oxidation of a magnet powder and its accompanying combustion. Furthermore, high magnetic coercive force can be obtained using the samarium-iron-nitrogen magnetic powder having an average particle diameter of 2.8 µm or less.

The samarium-iron-nitrogen magnet can be pulverized using a known pulverizer for pulverizing various materials to desired degrees, which has been broadly used in various chemical industries handling solids. Examples of a pulverizer are not particularly limited, and pulverization is preferably performed using an apparatus based on a wet pulverizing system using a medium agitation mill or a bead mill because of the ease of realizing a uniform powder composition and a uniform particle diameter.

Examples of a solvent that can be used for pulverization include, but are not particularly limited to, isopropyl alcohol, ethanol, toluene, methanol, and hexane. In particular, isopropyl alcohol is preferably used.

As described above, after pulverization, the resultant is filtered with a filter having a predetermined mesh size and then dried, so that a samarium-iron-nitrogen magnetic fine powder can be obtained.

Note that when the above pulverization is performed or after pulverization, a composite metal phosphate coating is preferably formed by adding phosphoric acid to the powder and then agitating the solution. In addition, the magnetic powder is preferably surface-treated with a coupling agent. Examples of a coupling agent include silane coupling agent, a titanium coupling agent, and an aluminium coupling agent.

In particular, surface treatment is preferably performed using a silane coupling agent.

In the composition for bonded magnets according to the embodiment, the content of a samarium-iron-nitrogen magnet powder is 88 mass % or more 91 mass % or less. When the content of a magnet powder in the composition is less than 88 mass %, in addition to decreased magnetic properties of the resulting bonded magnet, the increased proportion of the resin increases the linear expansion coefficient of the bonded magnet, so that cracking takes place in a thermal shock test. On the other hand, when the content of a magnet powder is higher than 91 mass %, the fluidity of the composition for bonded magnets is deteriorated, so that a bonded magnet cannot be molded by injection molding or the like. Moreover, poor appearance such as a weld can take place upon injection molding.

[2] Thermoplastic Resin Binder

The composition for bonded magnets according to the embodiment contains a thermoplastic resin binder as a resin binder. Specifically, as the thermoplastic resin binder, a polyamide elastomer (A) and a polyamide resin (B) are mixed for use.

(A) Polyamide Elastomer

A polyamide elastomer having a polyamide segment and a polyether segment can be used as a polyamide elastomer. In the composition for bonded magnets according to the embodiment, a polyamide elastomer having a tensile elongation at break of 400% or more, and a bending modulus of elasticity of 100 MPa or more is used. The use of a polyamide elastomer having such a tensile elongation at break and a bending modulus of elasticity can effectively prevent cracking from taking place in a thermal shock test.

The content of a polyamide elastomer in the composition for bonded magnets is 0.5 mass % or more and 2.5 mass % or less. When the content of a polyamide elastomer in the composition is less than 0.5 mass %, cracking takes place in a thermal shock test. On the other hand, when the content of a polyamide elastomer is higher than 2.5 mass %, the fluidity of the composition for bonded magnets is deteriorated, so that a bonded magnet cannot be molded by injection molding or the like.

(B) Polyamide Resin

Polyamide 12 is used as a polyamide resin. In general, examples of a polyamide resin include various polyamide resins such as polyamide 11 and polyamide 6. The use of polyamide 12 results in better fluidity during molding, so as to facilitate the molding by injection molding. The use of polyamide 12 can lead to more enhanced strength of the thus obtained bonded magnet.

Polyamide 12; that is, a polyamide resin, to be used herein has a weight average molecular weight Mw of 4500 or more and 7500 or less, as determined by molecular weight distribution measurement. When the weight average molecular weight Mw is less than 4500, the resulting bonded magnet has decreased mechanical strength. On the other hand, when the weight average molecular weight Mw is higher than 7500, the composition for bonded magnets has significantly decreased fluidity, making injection molding thereof difficult. In addition, if injection molding is attempted at a high temperature in order to increase the fluidity, a bonded magnet excellent in magnetic properties cannot always be obtained due to the oxidative deterioration of the magnetic powder.

In this embodiment, the composition for bonded magnets containing each component in the above specified content contains, as the remainder, a polyamide resin comprising polyamide 12. Therefore, the content of the remainder is not particularly limited, but is preferably 3.5 mass % or more and 10.7 mass % or less. When the content of the polyamide resin in the composition is less than 3.5 mass %, the composition for bonded magnets has deteriorated fluidity, so that a bonded magnet may not be molded by injection molding or the like. On the other hand, when the content of the polyamide resin is higher than 10.7 mass %, the bonded magnet has increased linear expansion coefficient, so that cracking can take place in a thermal shock test.

The form of the above-mentioned thermoplastic resin binder prepared by mixing the polyamide elastomer (A) and the polyamide resin (B) is not particularly limited. For example, the thermoplastic resin binders in various forms including powders, beads, pellets, and the like can be used. Of these examples, the thermoplastic resin binder in the form of powder is preferred since a magnet powder can be uniformly mixed.

[3] Strengthening Agent

The composition for bonded magnets according to the embodiment contains carbon fibers as a strengthening agent. In general, examples of a strengthening agent include various strengthening agents such as carbon flakes and glass fibers. The use of carbon fibers can effectively enhance the tensile strength of the resulting bonded magnet. In addition, carbon fibers to be used in this embodiment have a fiber diameter of 10 μm or more and 12 μm or less. Such carbon fibers contained therein having a fiber diameter of 10 μm or more and 12 μm or less can enhance the strength of the bonded magnet, improve the fluidity of the composition, and enhance the moldability.

The content of carbon fibers in the composition for bonded magnets is 0.5 mass % or more and 2.0 mass % or less. When the content of carbon fibers in the composition is less than 0.5 mass %, the strength of bonded magnet cannot be sufficiently increased, and cracking takes place in a thermal shock test. On the other hand, when the content of carbon fibers is higher than 2.0 mass %, the fluidity of the composition for bonded magnets is deteriorated, and thus a bonded magnet cannot be molded by injection molding or the like.

[4] Additive

The composition for bonded magnets according to the embodiment contains a carboxylic acid ester. Examples of a carboxylic acid ester can include a sebacic acid ester and an adipic acid ester. Generally, in order to improve fluidity during injection molding, an additive such as a lubricant represented by hydrocarbon lubricants or fatty acid lubricants or plasticizers of various esters is used. With the use of a carboxylic acid ester such as a sebacic acid ester or an adipic acid ester, when the thus obtained bonded magnet, a metal component, and the like are bonded via an adhesive such as an epoxy adhesive to form an integrally molded component, the metal component can be bonded successfully without weakening the adhesion.

The content of a carboxylic acid ester in the composition for bonded magnets is 0.3 mass % or more and 1.0 mass % or less. When the content of a carboxylic acid ester in the composition is less than 0.3 mass %, sufficient bonding strength between the bonded magnet and a metal component and the like cannot be obtained, although the mechanism thereof is unknown. On the other hand, when the content of a carboxylic acid ester is higher than 1.0 mass %, the bonded magnet is cracked in a thermal shock test.

In addition to the above-mentioned components, an additive such as a stabilizing agent, a pigment, and a compatibilizer can be added as necessary to an extent such that the addition does not deteriorate the effects of the composition for bonded magnets according to the embodiment.

<<2. Method for Producing Composition for Bonded Magnets>>

Next, a method for producing the above-mentioned composition for bonded magnets is explained. The composition for bonded magnets according to the embodiment can be produced by conventionally known methods.

Specifically, the composition for bonded magnets can be produced by weighing the predetermined amount of each of the above components, mixing the components using an agitation mixer or the like, and then kneading the resultant using a kneading apparatus.

A kneading apparatus is not particularly limited, and a batch-type kneader, a continuous extruder, or the like can be used. Kneading is preferably performed using each kneading apparatus while controlling the shear force to be applied to a composition while kneading. For example, when a kneader is used, the shear force is controlled by adjusting the temperature, the amount of raw materials to be added to a mixing tank, the number of revolutions of kneading blades, the time for kneading, and the like. When a continuous extruder is used, the shear force can be controlled by adjusting the temperature distribution, the addition rate of raw materials, the shape of a screw segment, the number of revolutions of a screw, the hole diameter of a die, and the like.

<<3. Bonded Magnet>>

A bonded magnet can be prepared using the composition for bonded magnets produced as described above. Specifically, a bonded magnet can be obtained as a molded article by heating and melting the above-described composition for bonded magnets at a temperature; that is the melting point or higher of a constitutive binder resin, and molding the melted product in the magnetic field by injection molding, extrusion, compression molding, or the like. In this embodiment, the temperature for heating and melting preferably ranges from 200° C. to 250° C. since a thermoplastic resin binder containing polyamide 12 that is a polyamide resin is used.

Among the above molding methods, particularly injection molding is preferred in that the degree of freedom for the shape of a bonded magnet that is a molded article is high, and the resulting bonded magnet has good surface properties and good magnetic properties, and thus can be directly incorporated as a part into the electronic component. Furthermore, the composition for bonded magnets according to the embodiment are configured as described above, so that it has good fluidity, is excellent in moldability during injection molding, and can be easily molded. Moreover, poor appearance such as a weld can be effectively prevented during injection molding.

The thus obtained bonded magnet that is molded by injection molding or the like as described above is excellent in magnetic properties, has high durability in terms of thermal shock test, so that no cracking takes place, and is excellent in mechanical strength. The bonded magnet is characterized in that it is used for small and flat products with complicated shapes, such as motor components for electronics, for example, can be mass-produced, requires no post-processing, and can be subjected to insert molding, for example. In particular, the bonded magnet can be suitably used for a component to be integrally molded with a metal material.

In addition, the resulting bonded magnet is desirably magnetized before use. For magnetization, electromagnet for generating a static magnetic field, a condenser magnetizer for generating a pulsed magnetic field, or the like is used. Magnetization magnetic field, that is, magnetic field strength slightly differs depending on the types of magnet powder and cannot be simply determined. Magnetic field strength is 1200 kA/m (15 kOe) or more and preferably 2400 kA/m (30 kOe) or more, for example.

<<4. Integrally Molded Component of Bonded Magnet and Metal Material>>

A bonded magnet obtained from the composition for bonded magnets according to the embodiment can be produced into an integrally molded component in combination with a metal component by bonding via an adhesive by insert molding or the like.

In addition, the integrally molded component of a bonded magnet and a metal component can be prepared by known methods. For example, the integrally molded component can be produced by coating the bonding surface between the bonded magnet and the metal component with a predetermined adhesive, and then maintaining the resultant at normal temperature for 12 hours to 24 hours.

In general, a bonded magnet material differs from a metal component in linear expansion coefficient. Hence, when a thermal shock test is conducted, the bonded magnet is cracked. In this regard, a bonded magnet obtained from the composition for bonded magnets according to the embodiment is excellent in mechanical strength as described above. Accordingly, when an integrally molded component is formed in combination with a metal component, cracking can be effectively prevented from taking place in the bonded magnet.

Furthermore, a bonded magnet obtained from the composition for bonded magnets according to the embodiment can impart excellent adhesiveness to the metal component without weakening the adhesion, when the integrally molded component is produced by bonding via an adhesive such as an epoxy adhesive.

EXAMPLES

The present invention is more specifically described with reference to examples and comparative examples, however, the present invention is not limited by these examples.

Example 1

90 mass % of a samarium-iron-nitrogen (Sm—Fe—N-based) magnet powder (Sumitomo Metal Mining Co., Ltd.) having an average particle diameter of 2.3 μm, 6.2 mass % of a polyamide 12 resin having a weight average molecular weight Mw of 5300, 2.0 mass % of a polyamide elastomer having a tensile elongation at break of 530% and a bending modulus of elasticity of 130 MPa, 1.0 mass % of carbon fibers (C fiber) as a strengthening agent having a fiber diameter of 11 μm, and 0.8 mass % of a sebacic acid ester as an additive were mixed using an agitation mixer, and then the mixture was kneaded using a continuous extruder at 200° C., thereby obtaining a composition for bonded magnets.

The thus obtained composition for bonded magnets was subjected to injection molding, and then the product was evaluated as described below for fluidity during molding, durability in terms of thermal shock test, and bonding strength.

<Method for Evaluation of Fluidity during Molding>

Injection molding was performed at a molding temperature of 240° C. using four pin-point gates, so as to produce a ring shape having an outside diameter of 32 mm, an inside diameter of 30 mm, and a height of 20 mm. Upon injection molding, a molded article produced without poor appearance such as a weld with injection pressure of 200 MPa was evaluated as ◉, and a molded article produced without poor appearance such as a weld with injection pressure of 250 MPa was evaluated as "○". On the other hand, a molded article produced with poor appearance such as a weld even with injection pressure of 250 MPa was evaluated as "×", meaning this was deficient in moldability, and no evaluation was made for this article for the following thermal shock test and adhesiveness.

<Method for Evaluating Durability in Terms of Thermal Shock Test (Heat Shock)>

The bonded magnet molded by the molding method at the time of the above evaluation of fluidity was bonded to the inside of an iron ring having an outside diameter of 34 mm, an inside diameter of 32 mm, and a height of 22 mm using an epoxy adhesive, and then maintained at normal temperature for 24 hours. A thermal shock test was then conducted with each cycle of −40° C. for 30 minutes to +90° C. for 30 minutes. After 300 cycles and 600 cycles, whether or not defects such as fissures had been developed on the bonded magnet was confirmed using an optical microscope with magnification of ×20. A bonded magnet for which the number of defects was found to be 0 out of 10 test samples thereof after 300 cycles was evaluated as "○". A bonded magnet for which the number of defects was found to be 0 after 600 cycles was evaluated as "◉". On the other hand, a bonded magnet for which even one defect was found after 300 cycles was evaluated as "×".

<Method for Evaluating Bonding Strength (Adhesiveness)>

After completion of 600 cycles of the above thermal shock test, a bonded magnet adhered to the iron ring was pulled out using an iron shaft having a diameter of 31.5 mm, and then the bonding strength was measured. A bonded magnet having the average bonding strength of 5000N or more was evaluated as "◉", a bonded magnet having the average bonding strength of less than 5000N and 1000N or more was evaluated as "Δ", and a bonded magnet having the average bonding strength of less than 1000N was evaluated as "×".

Table 1 below shows the result of each evaluation. As shown in Table 1, in the case of the bonded magnet formed from the composition for bonded magnets obtained in Example 1, the magnet could be successfully formed with injection pressure of 200 MPa without poor appearance such as a weld, suggesting its high fluidity during molding. Moreover, in a thermal shock test, the number of defects was 0 even after 600 cycles, indicating its high durability. Furthermore, its bonding strength with the iron ring was 5000N or more, revealing that the adhesiveness with the metal component was also found to be very high.

Example 2

A composition for bonded magnets was prepared and evaluated in a manner similar to that in Example 1, except that the content of a polyamide 12 resin having a weight average molecular weight Mw of 5300 was 5.2 mass % and the content of carbon fibers as a strengthening agent having a fiber diameter of 11 μm was 2.0 mass %.

Example 3

A composition for bonded magnets was prepared and evaluated in a manner similar to that in Example 1, except that the content of a polyamide 12 resin having a weight average molecular weight Mw of 5300 was 6.7 mass % and the content of carbon fibers as a strengthening agent having a fiber diameter of 11 μm was 0.5 mass %.

Example 4

A composition for bonded magnets was prepared and evaluated in a manner similar to that in Example 1, except that the content of a polyamide 12 resin having a weight average molecular weight Mw of 5300 was 6.0 mass % and the content of a sebacic acid ester as an additive was 1.0 mass %.

Example 5

A composition for bonded magnets was prepared and evaluated in a manner similar to that in Example 1, except that the content of a polyamide 12 resin having a weight average molecular weight Mw of 5300 was 6.7 mass %, and the content of a sebacic acid ester as an additive was 0.3 mass %.

Example 6

A composition for bonded magnets was prepared and evaluated in a manner similar to that in Example 1, except that an adipic acid ester was used as an additive.

Example 7

A composition for bonded magnets was prepared and evaluated in a manner similar to that in Example 1, except that the content of a polyamide 12 resin having a weight average molecular weight Mw of 5300 was 5.7 mass % and the content of a polyamide elastomer having a tensile elongation at break of 530% and a bending modulus of elasticity of 130 MPa was 2.5 mass %.

Example 8

A composition for bonded magnets was prepared and evaluated in a manner similar to that in Example 1, except that the content of a polyamide 12 resin having a weight average molecular weight Mw of 5300 was 7.7 mass %, and the content of a polyamide elastomer having a tensile elongation at break of 530% and a bending modulus of elasticity of 130 MPa was 0.5 mass %.

Example 9

A composition for bonded magnets was prepared and evaluated in a manner similar to that in Example 1, except that the content of a Sm—Fe—N-based magnet powder (Sumitomo Metal Mining Co., Ltd.) as a magnetic powder having an average particle diameter of 2.3 μm was 91.0 mass % and the content of a polyamide 12 resin having a weight average molecular weight Mw of 5300 was 5.2 mass %.

Example 10

A composition for bonded magnets was prepared and evaluated in a manner similar to that in Example 1, except that the content of a Sm—Fe—N-based magnet powder (Sumitomo Metal Mining Co., Ltd.) as a magnet powder having an average particle diameter of 2.3 μm was 88.0 mass %, and the content of a polyamide 12 resin having a weight average molecular weight Mw of 5300 was 8.2 mass %.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| SFN | 90.0% | 90.0% | 90.0% | 90.0% | 90.0% | 90.0% | 90.0% | 90.0% | 91.0% | 88.0% |
| Polyamide resin | 6.2% | 5.2% | 6.7% | 6.0% | 6.7% | 6.2% | 5.7% | 7.7% | 5.2% | 8.2% |
| Polyamide elastomer | 2.0% | 2.0% | 2.0% | 2.0% | 2.0% | 2.0% | 2.5% | 0.5% | 2.0% | 2.0% |
| Strengthening agent | 1.0% | 2.0% | 0.5% | 1.0% | 1.0% | 1.0% | 1.0% | 1.0% | 1.0% | 1.0% |
| Additive | 0.8% | 0.8% | 0.8% | 1.0% | 0.3% | 0.8% | 0.8% | 0.8% | 0.8% | 0.8% |
| Total | 100.0% | 100.0% | 100.0% | 100.0% | 100.0% | 100.0% | 100.0% | 100.0% | 100.0% | 100.0% |
| Polyamide resin | Mw5300 PA12 | Mw5300 PA12 | Mw5300 PA12 | Mw5300 PA12 | Mw5300 PA12 | Mw5300 PA12 | Mw5300 PA12 | Mw5300 PA12 | Mw5300 PA12 | Mw5300 PA12 |
| Polyamide elastomer | 530% elongation Modulus of elasticity of 130 MPa | 530% elongation Modulus of elasticity of 130 MPa | 530% elongation Modulus of elasticity of 130 MPa | 530% elongation Modulus of elasticity of 130 MPa | 530% elongation Modulus of elasticity of 130 MPa | 530% elongation Modulus of elasticity of 130 MPa | 530% elongation Modulus of elasticity of 130 MPa | 530% elongation Modulus of elasticity of 130 MPa | 530% elongation Modulus of elasticity of 130 MPa | 530% elongation Modulus of elasticity of 130 MPa |
| Strengthening agent | C fiber φ11μ | C fiber φ11μ | C fiber φ11μ | C fiber φ11μ | C fiber φ11μ | C fiber φ11μ | C fiber φ11μ | C fiber φ11μ | C fiber φ11μ | C fiber φ11μ |
| Additive | Sebacic acid ester | Sebacic acid ester | Sebacic acid ester | Sebacic acid ester | Sebacic acid ester | Adipic acid ester | Sebacic acid ester | Sebacic acid ester | Sebacic acid ester | Sebacic acid ester |
| Fluidity | ◎ | ○ | ◎ | ◎ | ○ | ○ | ○ | ◎ | ○ | ◎ |
| Heat shock | ◎ | ◎ | ○ | ○ | ◎ | ◎ | ◎ | ○ | ○ | ○ |
| Adhesiveness | ◎ | ◎ | ◎ | ◎ | ◎ | ◎ | ◎ | ◎ | ◎ | ◎ |

Comparative Example 1

A composition for bonded magnets was prepared and evaluated in a manner similar to that in Example 1, except that the content of a polyamide 12 resin having a weight average molecular weight Mw of 5300 was 4.7 mass % and the content of carbon fibers as a strengthening agent having a fiber diameter of 11 μm was 2.5 mass %.

Table 2 below shows the evaluation results. Note that the evaluation results of the following Examples 2 to 20 are also similarly shown.

As a result, as shown in Table 2, the composition for bonded magnets obtained in Comparative example 1 had low fluidity so as to increase injection pressure, so that samples with defect-free appearance could not be obtained.

Comparative Example 2

A composition for bonded magnets was prepared and evaluated in a manner similar to that in Example 1, except that the content of a polyamide 12 resin having a weight average molecular weight Mw of 5300 was 6.9 mass % and the content of carbon fibers as a strengthening agent having a fiber diameter of 11 μm was 0.3 mass %.

As a result, as shown in Table 2, the composition for bonded magnets obtained in Comparative example 2 resulted in an insufficient reinforcing effect of the bonded magnet obtained from the composition, so that cracking took place in a thermal shock test.

Comparative Example 3

A composition for bonded magnets was prepared and evaluated in a manner similar to that in Example 1, except that carbon fibers having a fiber diameter of 7 μm were used as a strengthening agent.

As a result, as shown in Table 2, the composition for bonded magnets obtained in Comparative example 3 resulted in an insufficient reinforcing effect of the bonded magnet obtained from the composition, so that cracking took place in a thermal shock test.

Comparative Example 4

A composition for bonded magnets was prepared and evaluated in a manner similar to that in Example 1, except that glass fiber having a fiber diameter of 11 μm was used as a strengthening agent.

As a result, as shown in Table 2, the composition for bonded magnets obtained in Comparative example 4 resulted in an insufficient reinforcing effect of the bonded magnet obtained from the composition, and cracking took place in a thermal shock test.

Comparative Example 5

A composition for bonded magnets was prepared and evaluated in a manner similar to that in Example 1, except that the content of a polyamide 12 resin having a weight average molecular weight Mw of 5300 was 5.8 mass %, and the content of a sebacic acid ester as an additive was 1.2 mass %.

As a result, as shown in Table 2, in the case of the composition for bonded magnets obtained in Comparative example 5, the bonded magnet obtained from the composition was cracked in a thermal shock test.

Comparative Example 6

A composition for bonded magnets was prepared and evaluated in a manner similar to that in Example 1, except that the content of a polyamide 12 resin having a weight average molecular weight Mw of 5300 was 6.8 mass %, and the content of a sebacic acid ester as an additive was 0.2 mass %.

As a result, as shown in Table 2, in the case of the composition for bonded magnets obtained in Comparative example 6, the bonded magnet obtained from the composition exhibited decreased adhesion with the iron ring, so that samples with adhesion of 1000N or more could not be obtained.

Comparative Example 7

A composition for bonded magnets was prepared and evaluated in a manner similar to that in Example 1, except that no additive was added.

As a result, as shown in Table 2, the composition for bonded magnets obtained in Comparative example 7 had low fluidity so as to increase injection pressure, so that samples with defect-free appearance could not be obtained.

Comparative Example 8

A composition for bonded magnets was prepared and evaluated in a manner similar to that in Example 1, except that 2-ethylhexyl p-hydroxybenzoate (EHPB), a type of benzoic esters, was used as an additive.

As a result, as shown in Table 2, in the case of the composition for bonded magnets obtained in Comparative example 8, the bonded magnet obtained from the composition exhibited decreased adhesion with the iron ring, so that samples with adhesion of 1000N or more could not be obtained.

Comparative Example 9

A composition for bonded magnets was prepared and evaluated in a manner similar to that in Example 1, except that a stearamide wax, a type of fatty acid lubricants, was used as an additive.

As a result, as shown in Table 2, in the case of the composition for bonded magnets obtained in Comparative example 9, the bonded magnet obtained from the composition was cracked in a thermal shock test. Moreover, the bonded magnet exhibited decreased adhesion with the iron ring, so that samples with adhesion of 1000N or more could not be obtained.

Comparative Example 10

A composition for bonded magnets was prepared and evaluated in a manner similar to that in Example 1, except that a polyethylene wax (PE wax), a type of hydrocarbon lubricants was used as an additive.

As a result, as shown in Table 2, in the case of the composition for bonded magnets obtained in Comparative example 10, the bonded magnet obtained from the composition was cracked in a thermal shock test. Moreover, the bonded magnet exhibited decreased adhesion with the iron ring, so that samples with adhesion of 1000N or more could not be obtained.

Comparative Example 11

A composition for bonded magnets was prepared and evaluated in a manner similar to that in Example 1, except that the content of a polyamide 12 resin having a weight average molecular weight Mw of 5300 was 5.5 mass %, and the content of a polyamide elastomer having a tensile elongation at break of 530% and a bending modulus of elasticity of 130 MPa was 2.7 mass %.

As a result, as shown in Table 2, the composition for bonded magnets obtained in Comparative example 11 had low fluidity so as to increase injection pressure, so that samples with defect-free appearance could not be obtained.

Comparative Example 12

A composition for bonded magnets was prepared and evaluated in a manner similar to that in Example 1, except that a polyamide 12 resin having a weight average molecular weight Mw of 5300 was 7.9 mass %, and the content of a polyamide elastomer having a tensile elongation at break of 530% and a bending modulus of elasticity of 130 MPa was 0.3 mass %.

As a result, as shown in Table 2, in the case of the composition for bonded magnets obtained in Comparative example 12, the bonded magnet obtained from the composition was cracked in a thermal shock test.

Comparative Example 13

A composition for bonded magnets was prepared and evaluated in a manner similar to that in Example 1, except that a polyamide elastomer having a tensile elongation at break of 500% and a bending modulus of elasticity of 89 MPa was used in 2.0 mass %.

As a result, as shown in Table 2, in the case of the composition for bonded magnets obtained in Comparative example 13, the bonded magnet obtained from the composition was cracked in a thermal shock test.

Comparative Example 14

A composition for bonded magnets was prepared and evaluated in a manner similar to that in Example 1, except that a polyamide elastomer having a tensile elongation at break of 310% and a bending modulus of elasticity of 670 MPa was used in 2.0 mass %.

As a result, as shown in Table 2, in the case of the composition for bonded magnets obtained in Comparative example 14, the bonded magnet obtained from the composition was cracked in a thermal shock test.

Comparative Example 15

A composition for bonded magnets was prepared and evaluated in a manner similar to that in Example 1, except that the content of a Sm—Fe—N-based magnet powder (Sumitomo Metal Mining Co., Ltd.) as a magnet powder having an average particle diameter of 2.3 μm was 91.2 mass %, and the content of a polyamide 12 resin having a weight average molecular weight Mw of 5300 was 5.0 mass %.

As a result, as shown in Table 2, the composition for bonded magnets obtained in Comparative example 15 had low fluidity so as to increase injection pressure, so that samples with defect-free appearance could not be obtained.

Comparative Example 16

A composition for bonded magnets was prepared and evaluated in a manner similar to that in Example 1, except that the content of a Sm—Fe—N-based magnet powder (Sumitomo Metal Mining Co., Ltd.) as a magnet powder having an average particle diameter of 2.3 μm was 87.0 mass %, and the content of a polyamide 12 resin having a weight average molecular weight Mw of 5300 was 9.2 mass %.

As a result, as shown in Table 2, in the case of the composition for bonded magnets obtained in Comparative example 16, the bonded magnet obtained from the composition was cracked in a thermal shock test. Moreover, the bonded magnet had low magnetic properties.

Comparative Example 17

A composition for bonded magnets was prepared and evaluated in a manner similar to that in Example 1, except that a polyamide 12 resin as a polyamide resin having a weight average molecular weight Mw of 8000 was used in 6.2 mass %.

As a result, as shown in Table 2, the composition for bonded magnets obtained in Comparative example 17 had low fluidity so as to increase injection pressure, so that samples with defect-free appearance could not be obtained.

Comparative Example 18

A composition for bonded magnets was prepared and evaluated in a manner similar to that in Example 1, except that a polyamide 12 resin as a polyamide resin having a weight average molecular weight Mw of 4100 was used in 6.2 mass %.

As a result, as shown in Table 2, in the case of the composition for bonded magnets obtained in Comparative example 18, the resin had low absolute strength, and thus the bonded magnet obtained from the composition was cracked in a thermal shock test.

Comparative Example 19

A composition for bonded magnets was prepared and evaluated in a manner similar to that in Example 1, except that a polyamide 11 resin as a polyamide resin having a weight average molecular weight Mw of 9600 was used in 6.2 mass %.

As a result, as shown in Table 2, in the case of the composition for bonded magnets obtained in Comparative example 19, the resin had low absolute strength, and thus the bonded magnet obtained from the composition was cracked in a thermal shock test.

Comparative Example 20

A composition for bonded magnets was prepared and evaluated in a manner similar to that in Example 1, except that a polyamide 6 resin as a polyamide resin having a weight average molecular weight Mw of 5500 was used in 6.2 mass %.

As a result, as shown in Table 2, the composition for bonded magnets obtained in Comparative example 20 had low fluidity so as to increase injection pressure, so that samples with defect-free appearance could not be obtained.

TABLE 2

| | Comparative Example 1 | Comparative Example 2 | Comparative Example 3 | Comparative Example 4 | Comparative Example 5 |
|---|---|---|---|---|---|
| SFN | 90.0% | 90.0% | 90.0% | 90.0% | 90.0% |
| Polyamide resin | 4.7% | 6.9% | 6.2% | 6.2% | 5.8% |
| Polyamide elastomer | 2.0% | 2.0% | 2.0% | 2.0% | 2.0% |
| Strengthening agent | 2.5% | 0.3% | 1.0% | 1.0% | 1.0% |
| Additive | 0.8% | 0.8% | 0.8% | 0.8% | 1.2% |
| Total | 100.0% | 100.0% | 100.0% | 100.0% | 100.0% |
| Polyamide resin | Mw5300 PA12 | Mw5300 PA12 | Mw5300 PA12 | Mw5300 PA12 | Mw5300 PA12 |
| Polyamide elastomer | 530% elongation | 530% elongation | 530% elongation | 530% elongation | 530% elongation |
| Polyamide elastomer | Modulus of elasticity of 130 MPa | Modulus of elasticity of 130 MPa | Modulus of elasticity of 130 MPa | Modulus of elasticity of 130 MPa | Modulus of elasticity of 130 MPa |
| Strengthening agent | C fiber ϕ11μ | C fiber ϕ11μ | C fiber ϕ11μ | G fiber ϕ11μ | C fiber ϕ11μ |
| Additive | Sebacic acid ester | Sebacic acid ester | Sebacic acid ester | Sebacic acid ester | Sebacic acid ester |
| Fluidity | X | ◎ | ○ | ○ | ◎ |
| Heat shock | — | X | X | X | X |
| Adhesiveness | — | ◎ | ◎ | ◎ | ◎ |

| | Comparative Example 6 | Comparative Example 7 | Comparative Example 8 | Comparative Example 9 | Comparative Example 10 |
|---|---|---|---|---|---|
| SFN | 90.0% | 90.0% | 90.0% | 90.0% | 90.0% |
| Polyamide resin | 6.8% | 7.0% | 6.2% | 6.2% | 6.2% |
| Polyamide elastomer | 2.0% | 2.0% | 2.0% | 2.0% | 2.0% |
| Strengthening agent | 1.0% | 1.0% | 1.0% | 1.0% | 1.0% |
| Additive | 0.2% | 0.0% | 0.8% | 0.8% | 0.8% |
| Total | 100.0% | 100.0% | 100.0% | 100.0% | 100.0% |
| Polyamide resin | Mw5300 PA12 | Mw5300 PA12 | Mw5300 PA12 | Mw5300 PA12 | Mw5300 PA12 |
| Polyamide elastomer | 530% elongation | 530% elongation | 530% elongation | 530% elongation | 530% elongation |
| Polyamide elastomer | Modulus of elasticity of 130 MPa | Modulus of elasticity of 130 MPa | Modulus of elasticity of 130 MPa | Modulus of elasticity of 130 MPa | Modulus of elasticity of 130 MPa |
| Strengthening agent | C fiber ϕ11μ | C fiber ϕ11μ | C fiber ϕ11μ | C fiber ϕ11μ | C fiber ϕ11μ |
| Additive | Sebacic acid ester | — | EHPB | Stearamide | PE wax |
| Fluidity | ○ | X | ○ | ◎ | ◎ |
| Heat shock | ○ | — | ○ | X | X |
| Adhesiveness | Δ | — | X | X | X |

| | Comparative Example 11 | Comparative Example 12 | Comparative Example 13 | Comparative Example 14 | Comparative Example 15 |
|---|---|---|---|---|---|
| SFN | 90.0% | 90.0% | 90.0% | 90.0% | 91.2% |
| Polyamide resin | 5.5% | 7.9% | 6.2% | 6.2% | 5.0% |

TABLE 2-continued

|  |  |  |  |  |  |
|---|---|---|---|---|---|
| Polyamide elastomer | 2.7% | 0.3% | 2.0% | 2.0% | 2.0% |
| Strengthening agent | 1.0% | 1.0% | 1.0% | 1.0% | 1.0% |
| Additive | 0.8% | 0.8% | 0.8% | 0.8% | 0.8% |
| Total | 100.0% | 100.0% | 100.0% | 100.0% | 100.0% |
| Polyamide resin | Mw5300 PA12 | Mw5300 PA12 | Mw5300 PA12 | Mw5300 PA12 | Mw5300 PA12 |
| Polyamide elastomer | 530% elongation | 530% elongation | 500% elongation | 310% elongation | 530% elongation |
| Polyamide elastomer | Modulus of elasticity of 130 MPa | Modulus of elasticity of 130 MPa | Modulus of elasticity of 89 MPa | Modulus of elasticity of 670 MPa | Modulus of elasticity of 130 MPa |
| Strengthening agent | C fiber φ11μ | C fiber φ11μ | C fiber φ11μ | C fiber φ11μ | C fiber φ11μ |
| Additive | Sebacic acid ester | Sebacic acid ester | Sebacic acid ester | Sebacic acid ester | Sebacic acid ester |
| Fluidity | X | ⊚ | ⊚ | ○ | X |
| Heat shock | — | X | X | X | — |
| Adhesiveness | — | ⊚ | ⊚ | ⊚ | — |

|  | Comparative Example 16 | Comparative Example 17 | Comparative Example 18 | Comparative Example 19 | Comparative Example 20 |
|---|---|---|---|---|---|
| SFN | 87.0% | 90.0% | 90.0% | 90.0% | 90.0% |
| Polyamide resin | 9.2% | 6.2% | 6.2% | 6.2% | 6.2% |
| Polyamide elastomer | 2.0% | 2.0% | 2.0% | 2.0% | 2.0% |
| Strengthening agent | 1.0% | 1.0% | 1.0% | 1.0% | 1.0% |
| Additive | 0.8% | 0.8% | 0.8% | 0.8% | 0.8% |
| Total | 100.0% | 100.0% | 100.0% | 100.0% | 100.0% |
| Polyamide resin | Mw5300 PA12 | Mw8000 PA12 | Mw4100 PA12 | Mw9600 PA11 | Mw5500 PA6 |
| Polyamide elastomer | 530% elongation | 530% elongation | 530% elongation | 530% elongation | 530% elongation |
| Polyamide elastomer | Modulus of elasticity of 130 MPa | Modulus of elasticity of 130 MPa | Modulus of elasticity of 130 MPa | Modulus of elasticity of 130 MPa | Modulus of elasticity of 130 MPa |
| Strengthening agent | C fiber φ11μ | C fiber φ11μ | C fiber φ11μ | C fiber φ11μ | C fiber φ11μ |
| Additive | Sebacic acid ester | Sebacic acid ester | Sebacic acid ester | Sebacic acid ester | Sebacic acid ester |
| Fluidity | ⊚ | X | ⊚ | ⊚ | X |
| Heat shock | X | — | X | X | — |
| Adhesiveness | ⊚ | — | ⊚ | ⊚ | — |

INDUSTRIAL APPLICABILITY

The composition for bonded magnets according to the embodiments exhibits good fluidity during molding, enables to obtain a bonded magnet having durability in terms of thermal shock test, and being capable of imparting excellent adhesion when bonded to a metal component and the like using an adhesive, and is extremely useful as a composition for producing bonded magnets. The bonded magnet obtained from the composition for bonded magnets is characterized by being used for small and flat products with complicated shapes, such as motor components for electronics, enabling mass-production thereof, requiring no post-processing, and enabling insert molding thereof, for example. In particular, the bonded magnet can be suitably used as a molding component to be combined with a metal component.

The invention claimed is:

1. A composition for bonded magnets, comprising 88 mass % or more and 91 mass % or less of a samarium-iron-nitrogen magnet powder having an average particle diameter of 1.8 μm or more and 2.8 μm or less,
    0.5 mass % or more and 2.5 mass % or less of a polyamide elastomer having a tensile elongation at break of 400% or more and a bending modulus of elasticity of 100 MPa or more,
    0.5 mass % or more and 2.0 mass % or less of carbon fibers having a fiber diameter of 10 μm or more and 12 μm or less,
    and 0.3 mass % or more and 1.0 mass % or less of a carboxylic acid ester,
    wherein the remainder is a polyamide resin comprising polyamide 12 having a weight average molecular weight Mw of 4500 or more and 7500 or less as determined by molecular weight distribution measurement.

2. The composition for bonded magnets according to claim 1, wherein the samarium-iron-nitrogen magnet powder is composed of the composition of $Sm_2Fe_{17}N_3$.

3. A bonded magnet, which is produced by injection-molding using the composition for bonded magnets according to claim 1.

4. An integrally molded component, which is produced by integrally bonding the bonded magnet according to claim 3 to a metal component via an adhesive.

5. A bonded magnet, which is produced by injection-molding using the composition for bonded magnets according to claim 2.

6. An integrally molded component, which is produced by integrally bonding the bonded magnet according to claim 5 to a metal component via an adhesive.

* * * * *